United States Patent [19]
Nishtala et al.

[11] Patent Number: 5,919,265
[45] Date of Patent: Jul. 6, 1999

[54] SOURCE SYNCHRONIZATION DATA TRANSFERS WITHOUT RESYNCHRONIZATION PENALTY

[75] Inventors: Satyanarayana Nishtala, Cupertino; William Van Loo, Palo Alto, both of Calif.

[73] Assignee: Sun Microsystems, Inc., Palo Alto, Calif.

[21] Appl. No.: 08/653,900

[22] Filed: May 28, 1996

[51] Int. Cl.⁶ ....................................................... G06F 1/04
[52] U.S. Cl. ........................................... 713/400; 395/559
[58] Field of Search .................................... 395/551, 552, 395/555, 558, 559

[56] References Cited

U.S. PATENT DOCUMENTS

| | | | |
|---|---|---|---|
| 4,811,364 | 3/1989 | Sager et al. | 375/106 |
| 4,881,165 | 11/1989 | Sager et al. | 395/551 |
| 5,692,166 | 11/1997 | Milhizer et al. | 395/551 |
| 5,706,484 | 1/1998 | Mozdzen et al. | 395/551 |

*Primary Examiner*—Dennis M. Butler
*Attorney, Agent, or Firm*—James D. Ivey; Kang S. Lim

[57] ABSTRACT

A system clock generator for a computer system to efficiently transfer data from a source subsystem to a destination subsystem of the computer system. The system clock generator generates a globally synchronized clock signal for the source subsystem and the destination subsystem. The source subsystem includes a clock generator for generating a source clk (SRC_CLK) signal and a source-synchronous clock (SRC_SYN_CLK) signal for the source subsystem and destination subsystem, respectively. The SRC_SYN_ CLK signal is generated whenever data is transferred from the source subsystem to the destination subsystem. Upon receiving the data and SRC_SYN_CLK signal from the source subsystem, the data is synchronized at the destination subsystem using the SRC_SYN_CLK signal. Since the source and destination subsystems are synchronized by the system clock signal, an incoming data stream can be synchronized within one system clock cycle. In one embodiment, data from two streams can be multiplexed and combined into a single data signal at the source subsystem, thereby increasing the bandwidth of the computer system to twice the frequency of the system clock generator.

6 Claims, 7 Drawing Sheets

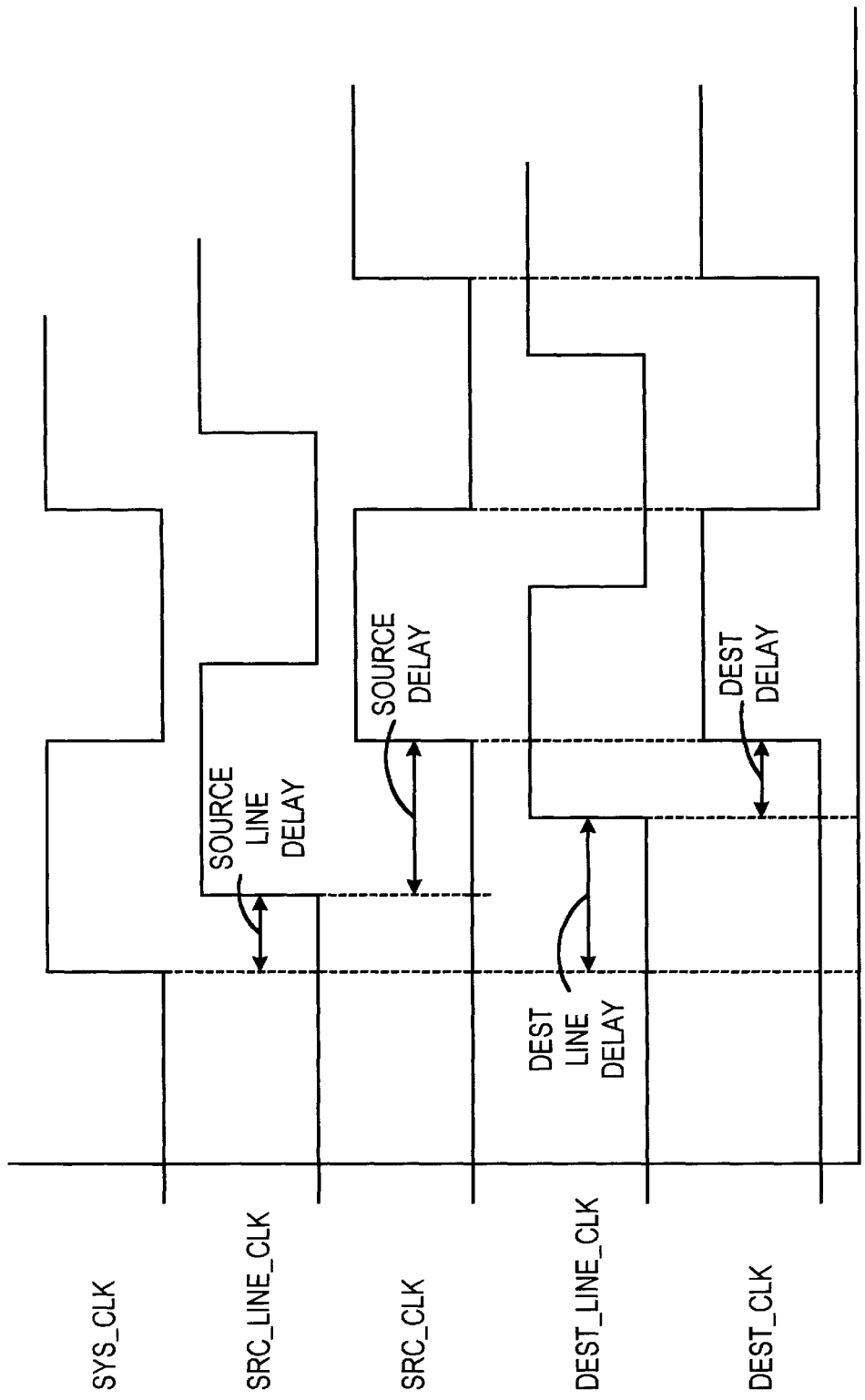

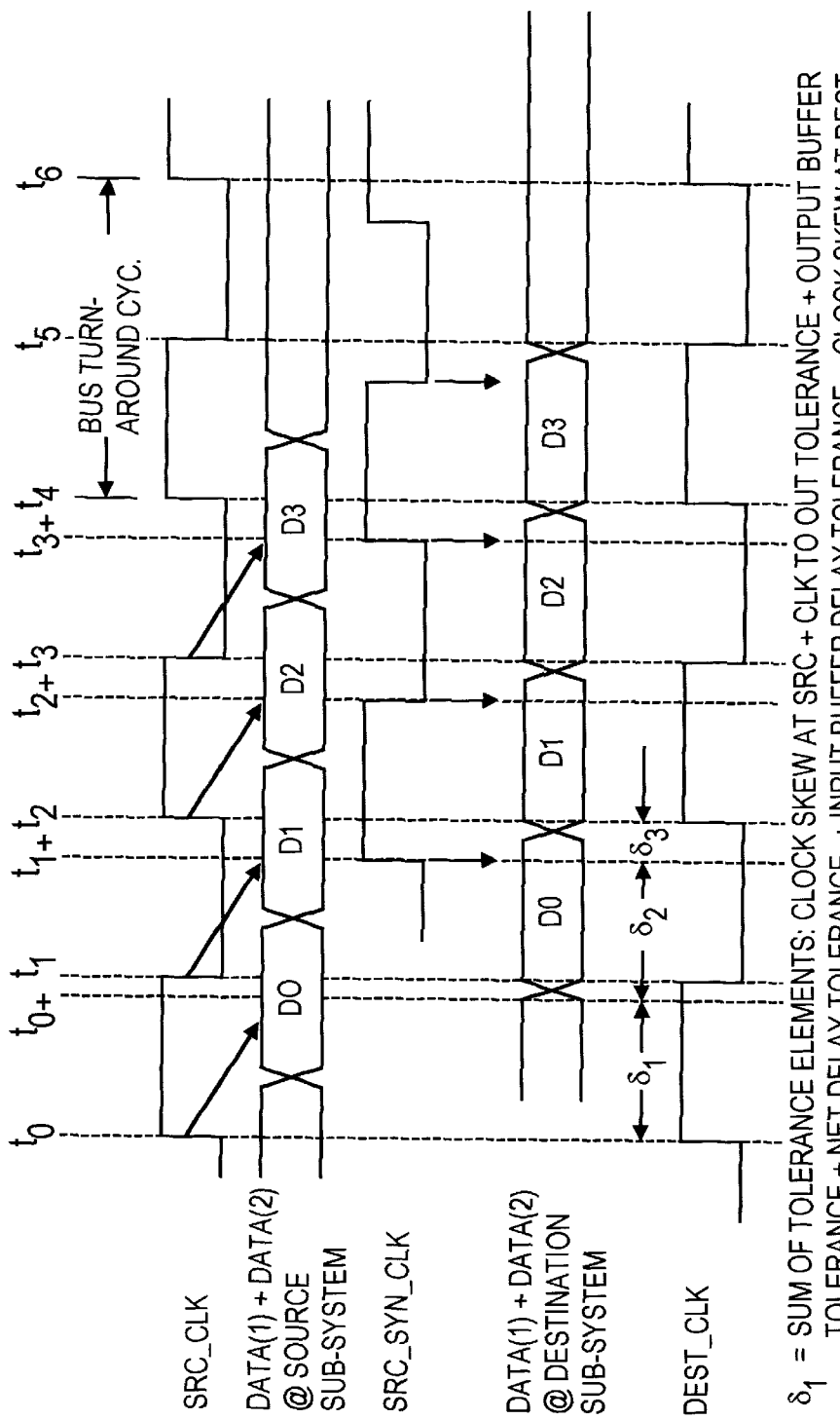

SOURCE SYNCHRONIZATION DATA TRANSFERS WITHOUT RESYNCHRONIZATION PENALTY

BACKGROUND OF THE INVENTION

1. Field of the Invention

This invention relates to digital systems. In particular, this invention relates to signal synchronization in a digital computer system.

2. Description of the Related Art

With the increase of system clock frequencies in digital computer systems, the difficulty of maintaining data signal synchronization in these digital computer systems, for example by distributing a global clock signal to the subsystems of these digital computer systems, increases correspondingly.

FIG. 1A is a block diagram illustrating a method of synchronizing data signals by distributing a global clock signal to a plurality of subsystems, e.g., a source subsystem 120 and a destination subsystem 130, located at different physical locations of a digital computer system 100. Computer system 100 also includes a system clock generator 110 and a corresponding plurality of delays, e.g., a source delay 112 and a destination delay 113. System clock generator 110 is coupled to a source clock generator 125 and a destination clock generator 135 of subsystems 120, 130 via delays 112, 113, respectively.

Referring now to the timing diagram of FIG. 1B, in order to synchronize source clock generator 125 and destination clock generator 135, suitable time delays are selected for delays 112 and 113 such that the total time a clock pulse takes to propagate from the output node of system clock generator 110 to either input nodes of source clock generator 125 or destination clock generator 135 are the same or close to the same. In other words, the difference in propagation through delays 112, 113 compensate for the relative propagation delays in the source and destination clock lines. Typically, a skew of up to 5% can be tolerated.

In this example, a source clock (SRC_CLK) signal at the input node of source clock generator 125, which is the global clock (SYS_CLK) signal delayed by the source line, i.e., the source line clock (SRC_LINE_CLK) signal, further delayed by source delay 112, is synchronized with or almost synchronized with a destination clock (DEST_CLK) signal at the input node of destination clock generator 135, i.e., the destination line clock (DEST_LINE_CLK) signal, further delayed by destination delay 113. As a result, data signals can be exchanged between subsystems 120 and 130 without any additional timing signals since both source clock generator 125 and destination clock generator 135 are kept synchronized by the SRC_CLK and DEST_CLK signals.

As shown in FIG. 1B, system 100 is capable of transferring a unit of data from source subsystem 120 to destination subsystem 130 per cycle of the SYS_CLK signal. Data transmitted before the rising edge of the SYS_CLK signal by source subsystem 120 is received before the next rising edge of the SYS_CLK signal by destination subsystem 130. Accordingly, there is no need to resynchronize data at destination subsystem 130. The maximum rate of data transfer is determined by the skew between the SRC_CLK and DEST_CLK signals, and by the propagation delay of data transfers from source subsystem 120 to destination subsystem 130.

FIG. 2 is a block diagram illustrating another method of synchronizing data signals, where instead of distributing a global clock signal to subsystems, a source subsystem 220 is required to provide a source-synchronous clock (SRC_SYN_CLK) signal whenever data is transferred between source subsystem 220 and a destination subsystem 230. In exemplary system 200, source subsystem 220 and destination subsystem 230 include source clock generator 225 and destination clock generator 235, respectively. Destination subsystem 230 also includes latches 232, 233, and 234 coupled in series.

The propagation delay of data and the SRC_SYN_CLK signal are closely matched. The maximum data transfer rate is not limited by the total propagation delay, but by the skew between data and the SRC_SYN_CLK signal. This technique allows data transfer rates that are higher than SRC_CLK signal of system 100.

Although the DEST_CLK signal of destination subsystem 130 has the same frequency as the SRC_SYN_CLK signal, the skew of DEST_CLK signal with respect to SRC_SYN_CLK signal is unknown and cannot be predicted with any accuracy. As a result, clocking the input data node of latch 233 of destination subsystem 130 with the DEST_CLK signal can result in metastability conditions in latch 233. To avoid the metastability problem, the output signal of latch 233 is relatched into latch 234, so that any metastability condition at the register 233 will have been resolved by the time the data is clocked by latch 234.

This two stage clocking introduces a penalty of one latent clock cycle. In some technologies, the metastability problem may not be resolvable by one latent clock cycle, and additional latent clock cycles may be necessary.

Hence, there is a need for a simple and effective scheme for reducing the lag time to one or less system clock cycle and which is capable of transferring more than one unit of data per system clock cycle.

SUMMARY OF THE INVENTION

The present invention provides a computer system with an efficient and fast mechanism for transferring data from a source subsystem to a destination subsystem of the computer system.

A system clock generator generates a globally synchronized clock signal for the source subsystem and the destination subsystem. The source subsystem includes a clock generator for generating a source clk (SRC_CLK) signal and a source-synchronous clock (SRC_SYN_CLK) signal for the source subsystem and destination subsystem, respectively.

The SRC_SYN_CLK signal is generated whenever data is transferred from the source subsystem to the destination subsystem. Upon receiving the data and SRC_SYN_CLK signal from the source subsystem, the data is synchronized at the destination subsystem using the SRC_SYN_CLK signal. Since the source and destination subsystems are synchronized by the system clock signal, an incoming data stream can be synchronized within one system clock cycle.

In one embodiment, data from two streams can be multiplexed and combined into a single data signal at the source subsystem, thereby increasing the bandwidth of the computer system to twice the frequency of the system clock generator. The combined signal is demultiplexed at the destination subsystem back to its component data streams.

In this implementation, a multiplier is used to generate a doubled (2x) frequency clock signal from the SRC_CLK signal for combining the source data streams at the source subsystem. At the destination subsystem, opposite phases of the SRC_SYN_CLK signal are used to demultiplex the incoming data signal by adding an inverter at the clock input node of one of the input latches in order to latch the incoming data stream at alternate phases of the SRC_SYN_CLK at the respective input latches.

DESCRIPTION OF THE DRAWINGS

The objects, features and advantages of the system of the present invention will be apparent from the following description in which:

FIG. 1B is a timing diagram showing a transfer of data from the source subsystem to the destination subsystem of FIG. 1A.

FIG. 4B is a timing diagram showing a transfer of data from the source subsystem to the destination subsystem of FIGS. 4AA and 4AB.

DESCRIPTION OF THE PREFERRED EMBODIMENT

In the following description, numerous details provide a thorough understanding of the invention. These details include functional blocks and an exemplary signal synchronization scheme to assist a designer in implementing efficient synchronous data transfers in a computer system. In addition, while the present invention is described with reference to a specific synchronization scheme for an exemplary computer system having at least two subsystems, the invention is applicable to the synchronization of a wide range of data/control signals and computer system architectures. In other instances, well-known circuits and structures are not described in detail so as not to obscure the invention unnecessarily.

Figure 1A:
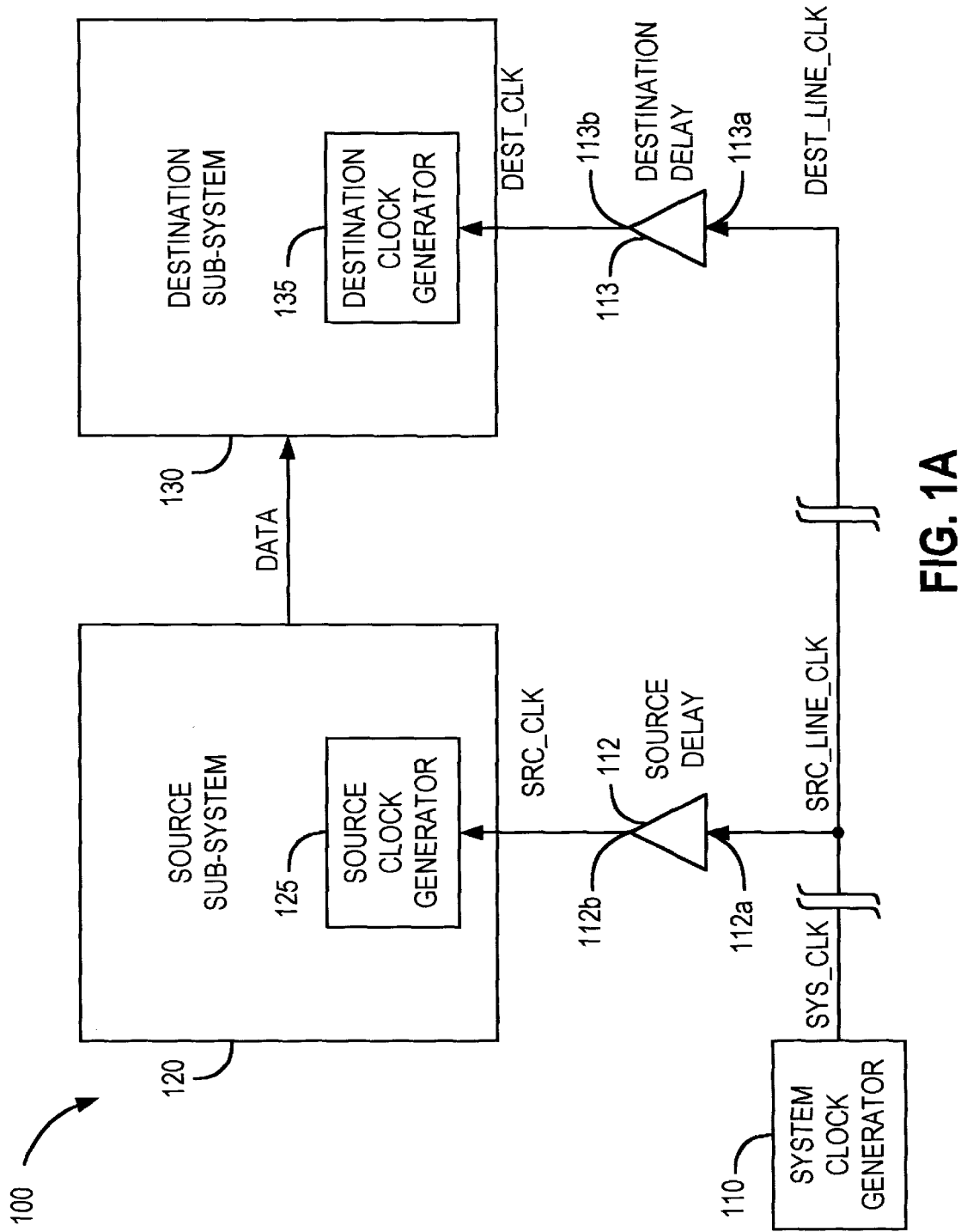
FIG. 1A is a block diagram illustrating a method of synchronizing data signals by distributing a global clock signal to a plurality of subsystems, including a source and a destination subsystem.
Figure 2:
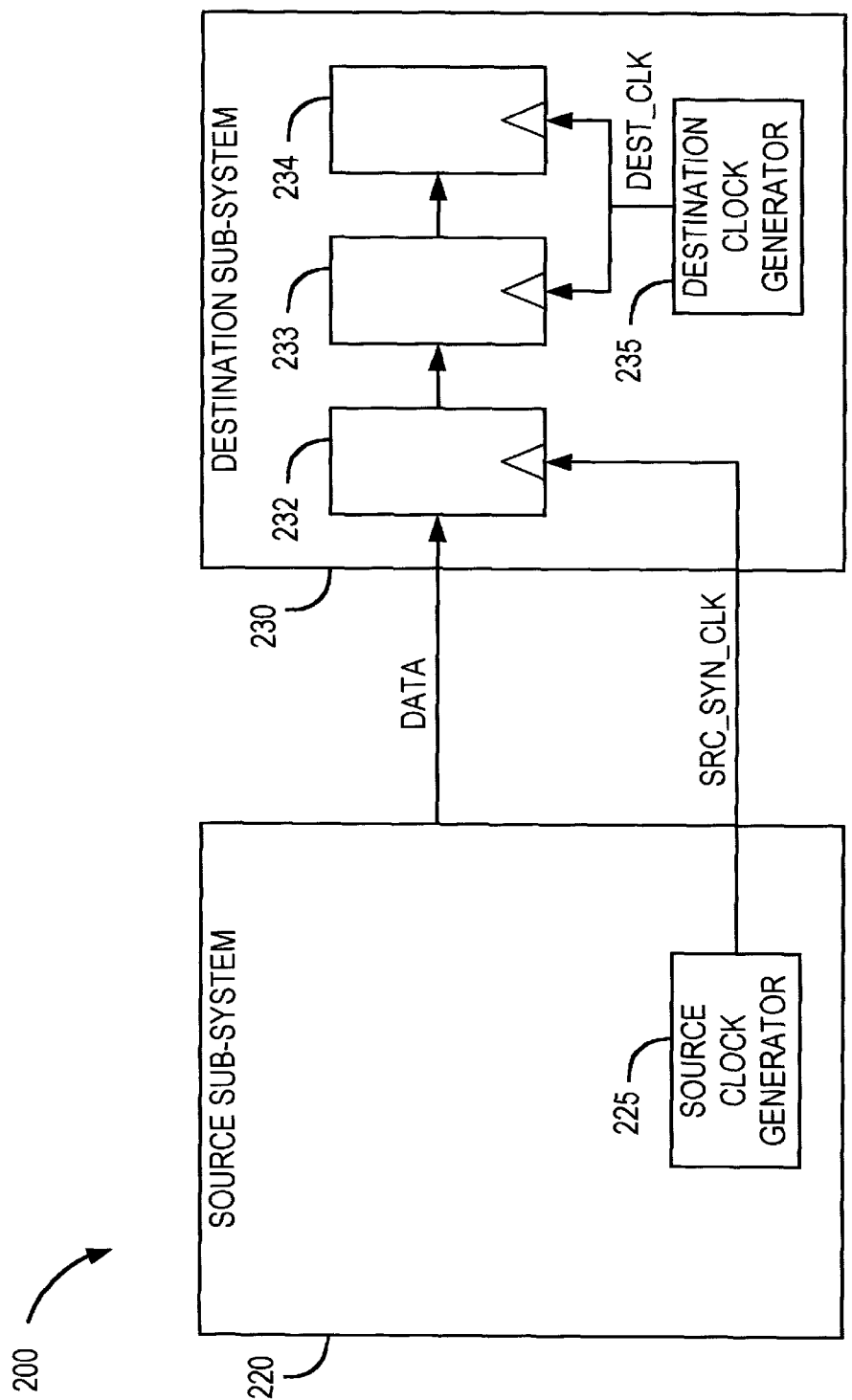
FIG. 2 is a block diagram illustrating another method of synchronizing data signals, wherein the source subsystem is required to provide a source-synchronous clock signal whenever data is transferred between the source subsystem and the destination subsystem.
Figure 3:
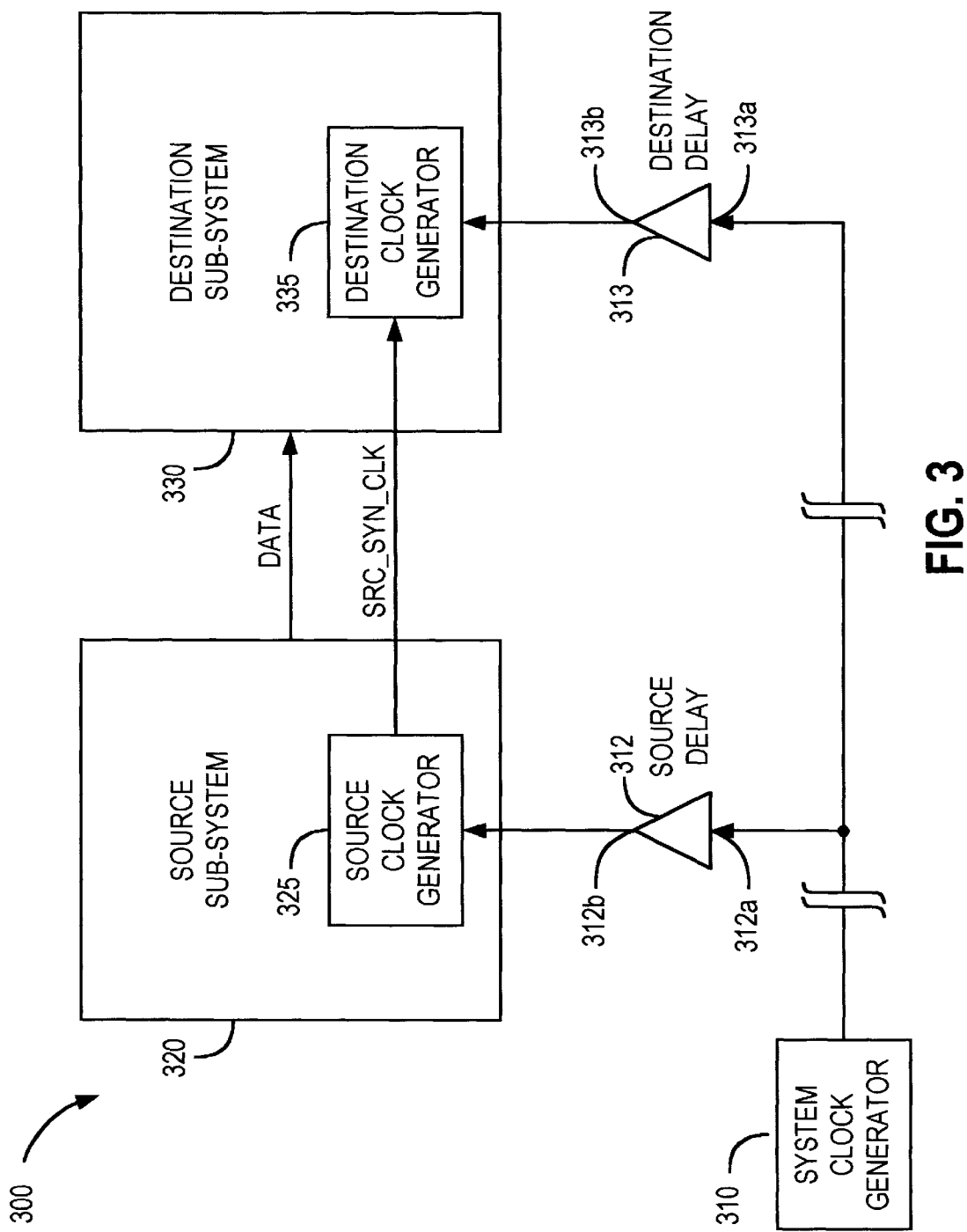
FIG. 3 is a block diagram showing a computer system with an exemplary signal synchronization scheme of the present invention.

FIG. 3 is a block diagram showing an exemplary signal synchronization scheme for a computer system 300. Computer system 300 includes a system clock generator 310, a source subsystem 320, a destination subsystem 330, a source delay 312 and a destination delay 313. Each subsystem also includes a clock generator, e.g., source subsystem 320 and destination subsystem 330 include a source clock generator 325 and a destination clock generator 335, respectively.

In accordance with the present invention, system clock generator 310, via source and destination delays 312, 313 provides globally-synchronous clock signals to the respective clock generators of two or more subsystems, e.g., source clock (SRC_CLK) signal to source clock generator 325 via source delay 312, and destination clock (DEST_CLK) signal to destination clock generator 335 via destination delay 313. In addition, a source-synchronous clock (SRC_SYN_CLK) signal is provided by source clock generator 325 to destination clock generator 335 when data is being transferred between source subsystem 320 and destination subsystem 330. As a result, destination subsystem 330 is able to synchronize an incoming data signal from source subsystem 320 within one clock cycle and also able to transfer data at up to twice the system clock speed.

Figure 4A:
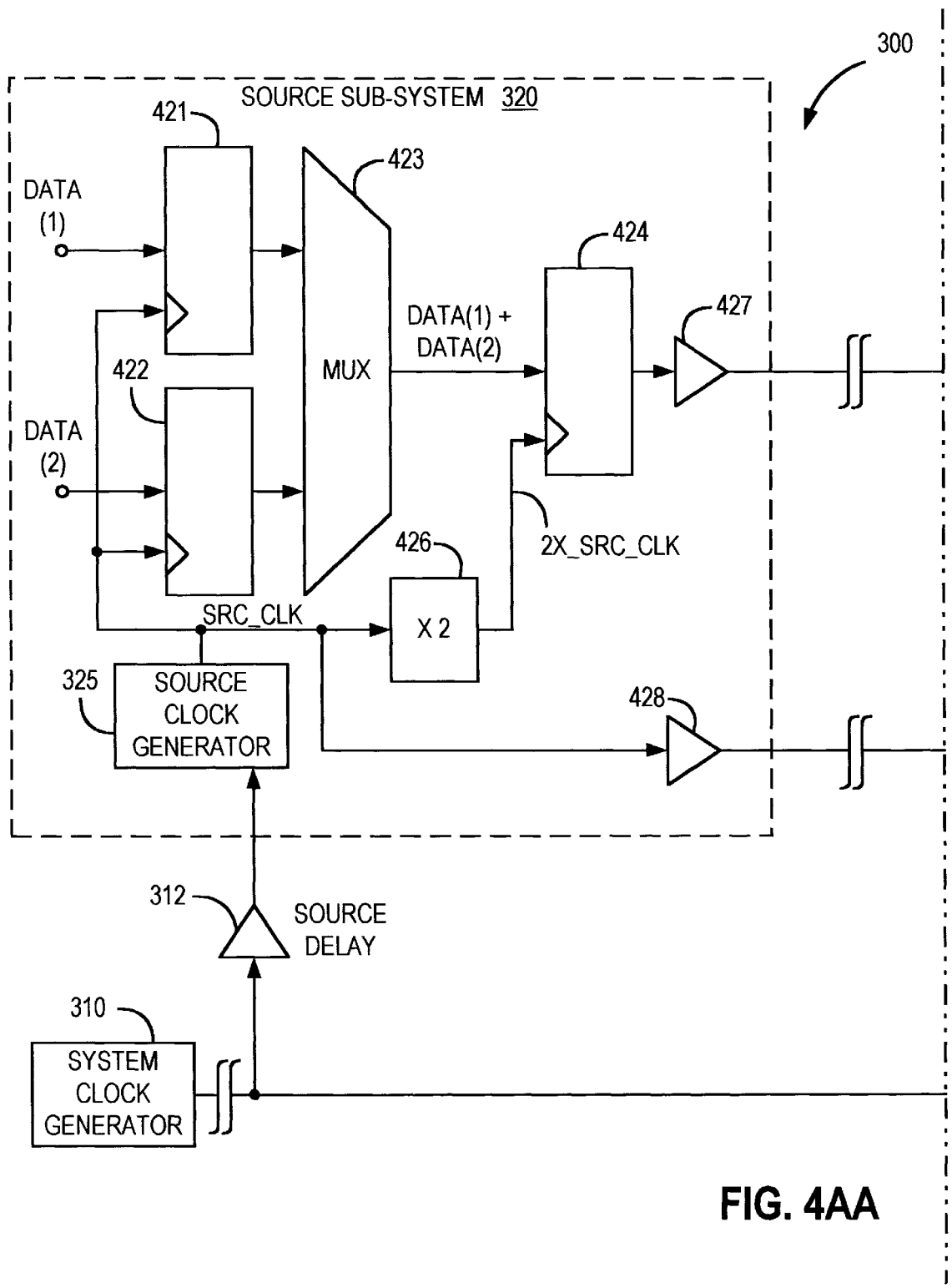
FIGS. 4AA and 4AB is a block diagram showing the computer system of FIG. 3 in greater detail.
Figure 4A:
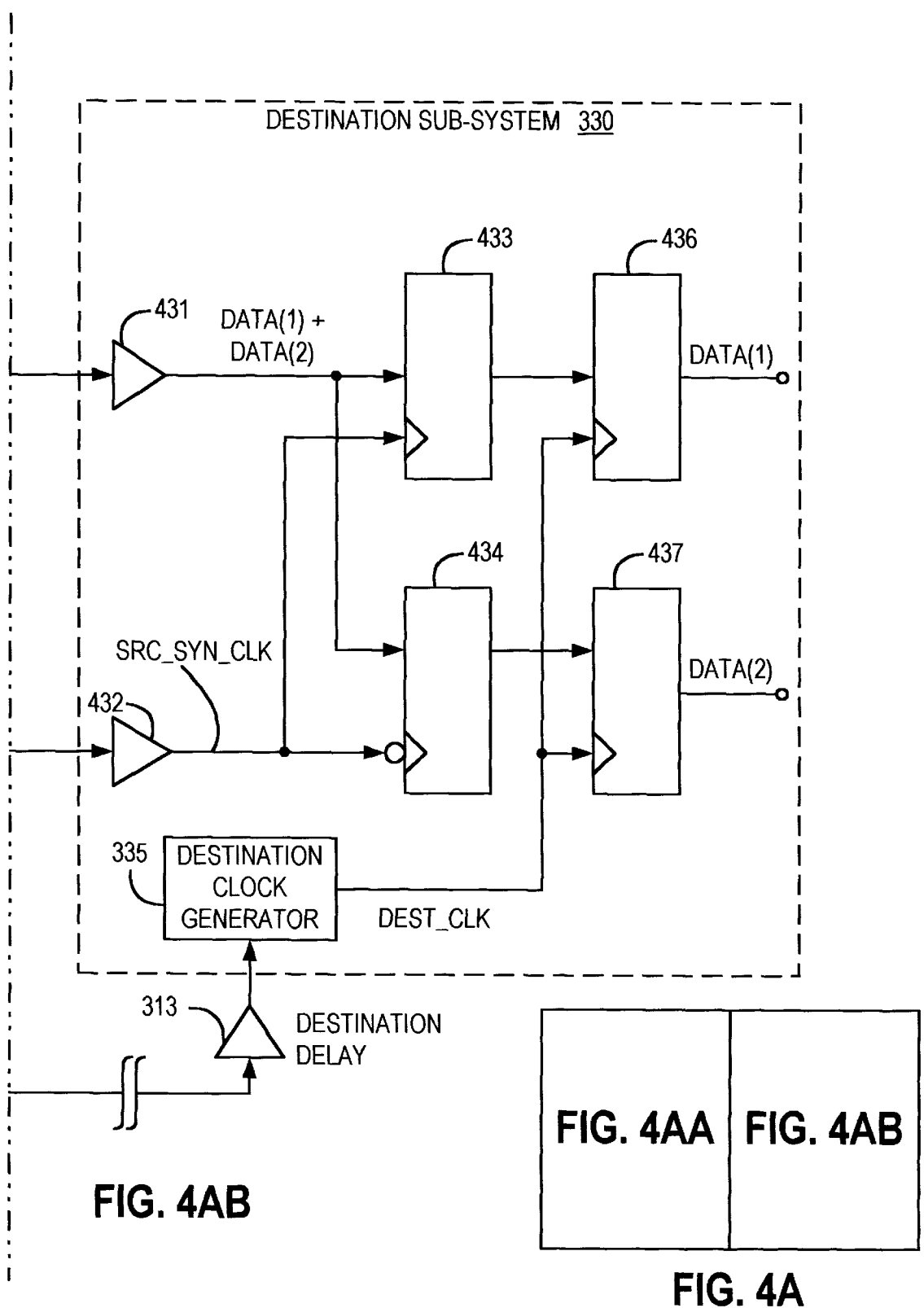

FIG. 4A is a block diagram showing computer system 300 in greater detail. In addition to source clock generator 325, source subsystem 320 also includes input latches 421, 422, a multiplexor (MUX) 423, an output latch 424, a clock multiplier 426 and output drivers 427, 428. Destination subsystem 330 includes destination clock generator 335, input drivers 431,432, input latches 433,434 and output latches 436,437.

Within source subsystem 320, the output nodes of latches 421,422 are coupled to the input nodes of MUX 423. The output node of MUX 423 is coupled to the input node of output latch 424. The output node of output latch 424 is coupled to the input node of output driver 427.

Source clock generator 325 provides SRC_CLK signal to input latches 421, 422. Source clock generator 325 also provides SRC_CLK signal to clock multiplier 426 which doubles the frequency and generates a doubled-source clock (2X_SRC_CLK) signal to output latch 424. In addition, source clock generator provides SRC_CLK signal to destination subsystem 330 via output driver 428.

With respect to destination subsystem 330, the output node of output driver 427 is coupled to the input node of input driver 431. The output node of input driver 431 is coupled to the input nodes of input latches 433,434. The output nodes of input latches 433,434 are coupled to the respective input nodes of output latches 436,437.

Input driver 432 provides opposite phases of SRC_SYN_CLK signal from source subsystem 320 to the respective input nodes of input latches 433, 434. Destination clock generator 335 provides a DEST_CLK signal to both output latches 436,437. In accordance with one aspect of the invention, the SRC_CLK signal from source subsystem 320 functions as the SRC_SYN_CLK signal for destination subsystem 330. Note that since SRC_CLK signal and DEST_CLK signal are kept synchronized by system clock generator 310 via source and destination delays 312, 313, respectively.

FIG. 4B is a timing diagram illustrating the synchronization scheme of the present invention. Note that time delay d1 is the sum of the following tolerances: the skew of SRC_CLK signal, clock multiplier 426, output driver 427, the line delay between drivers 427 and 431, the tolerance of input driver 431, the skew of DEST_CLK signal and duty cycle tolerance. Time delay d2 is the sum of the SRC_SYN_CLK delays: delay from source clock generator 325 to output driver 428, the delay through output driver 428, line delay between drivers 428 and 432, delay through input driver 432, and the set-up time at input latches 433 and 434. Time delay d3 is the sum of the clock input node to output node delays of latches 433 or 434, and the setup time of latches 436 or 437. Time t0, t1, t2, t3, . . . correspond to the rising and falling edges of the synchronous SRC_CLK and DEST_CLK signals.

Beginning at time t0, SRC_CLK signal latches the first bits of DATA(1) and DATA(2) signals, D0 and D1, into input latches 421 and 422, respectively. Bits D0 and D1 from DATA(1) and DATA(2) signals are combined in MUX 423 and the data bits D0, D1, D2, D3 . . . latched into output latch 424 in an interleaving manner at time t1, t2, t3, t4 . . . using the 2X_SRC_CLK signal from clock multiplier 426. Source subsystem 320 then sends the combined DATA(1)+DATA(2) signal and SRC_CLK signal, functioning as SRC_SYN_CLK signal, to destination subsystem 330.

By time t1+, the first bit of DATA(1)+DATA(2) signal, data bit D0, and SRC_SYN_CLK signal have arrived at the respective input drivers 431 and 432 of destination subsystem 330. The first (rising) edge of SRC_SYN_CLK signal is used to latch data bit D0 into input latch 433 at time t1+. Subsequently, at time t2+, the second interleaved data bit D1 is clocked into input latch 434 by the second (falling) edge of SRC_SYN_CLK signal.

The logic levels representing data bit D0, D1 are permitted to stabilize at input latches 433, 434 in order to avoid a meta-stable state. These stable logic levels representing bits D0, D1 are then latched into output latches 436, 437 at time t2 by the rising edge of DEST_CLK signal. As a result, computer system 300 is able to transfer first data bit D0 from source subsystem 320 to destination subsystem 330 within one clock cycle and at a data rate of up to twice the frequency of system clock generator 310. Note that data bit D0 is clocked into destination subsystem 130 at t2, which is as fast as is normally possible in a fully synchronous system. In other words, even though source synchronization is used to double the data transfer rate, there is no additional penalty in the form of extra latent clock cycles.

Modifications and additions of the above-described synchronization mechanism are possible without departing from the spirit of the invention. Hence, the scope of the invention should be determined by the following claims.

What is claimed is:

1. A method of synchronizing the transfer of data in a computer system having a source subsystem and a destination subsystem the method comprising the steps of:

providing a synchronized system clock signal to said source subsystem and said destination subsystem;

transmitting said data from said source subsystem to said destination subsystem at double the frequency of said system clock;

providing a source-synchronous clock (SRC_SYN_CLK) signal from said source subsystem to said destination subsystem while transmitting said data; and synchronizing said data at said destination subsystem using said SRC_SYN_CLK signal and said synchronized system clock signal; and multiplexing components of said data using both phases of a source clock signal derived from said system clock signal.

2. The method of claim 1 wherein said synchronizing step include the steps of:

latching said data using said SRC_SYN_CLK signal; and relatching said data using a destination clock signal derived from said synchronized system clock signal.

3. The method of claim 1 wherein the step of latching said data includes the step of latching said components using both phases of said SRC_SYN_CLK signal, and the step of relatching said data includes the step of relatching said components using both phases of said synchronized system clock signal.

4. A computer system comprising:

a system clock generator configured to generate a synchronized system clock signal for said computer system;

a source subsystem configured to transmit data and to provide a source-synchronous clock (SRC_SYN_CLK) signal; and a destination subsystem configured to receive said data and to synchronize said data using SRC_SYN_CLK signal and said synchronized system clock signal;

wherein said data is transmitted at double the frequency of said system clock signal, said source subsystem includes:

a pair of input latches configured to latch components of said data using both phases of a source clock signal derived from said system clock signal; and a multiplexor for combining said components.

5. The computer system of claim 4 wherein said destination subsystem includes:

a first input latch configured to latch said data using said SRC_SYN_CLK signal; and a first output latch configured to relatch said data using a destination clock signal derived from said synchronized system clock signal.

6. The computer system of claim 4 wherein said destination subsystem further includes a second input latch and a second output latch, and wherein said first and second input latches of said destination subsystem are configured to latch said components using both phases of said SRC_SYN_CLK signal, and said first and second output latches of said destination subsystem are configured to relatch said components using both phases of said synchronized system clock signal.

* * * * *